(12) United States Patent
Hansen

(10) Patent No.: US 6,591,896 B1
(45) Date of Patent: Jul. 15, 2003

(54) METHOD AND SYSTEM FOR PROVIDING A TRANSMISSION FLUID HEAT EXCHANGER IN-LINE WITH RESPECT TO AN ENGINE COOLING SYSTEM

(76) Inventor: Dennis Hansen, 2424 Hwy. 24, New Hampton, IA (US) 50659

(*) Notice: Subject to any disclaimer, the term of this patent is extended or adjusted under 35 U.S.C. 154(b) by 0 days.

(21) Appl. No.: 10/063,920
(22) Filed: May 23, 2002
(51) Int. Cl.⁷ ................................................ B60H 1/00
(52) U.S. Cl. ........................... 165/51; 165/41; 165/163; 165/164; 165/916; 123/41.33; 123/196 AB; 184/104.1
(58) Field of Search ............................ 165/41, 51, 164, 165/163, 916; 123/41.33, 196 AB; 184/104.1

(56) References Cited

U.S. PATENT DOCUMENTS

| | | | | |
|---|---|---|---|---|
| 1,494,437 A | * | 5/1924 | Manville | |
| 1,902,970 A | * | 3/1933 | Ramsaur et al. | |
| 1,931,935 A | * | 10/1933 | Paugh | |
| 1,983,466 A | * | 12/1934 | Kline | |
| 2,014,028 A | * | 9/1935 | Palmer | 165/51 |
| 2,041,928 A | * | 5/1936 | Hild | |
| 2,188,172 A | * | 1/1940 | Brehob | |
| 2,222,721 A | * | 11/1940 | Ramsaur et al. | |
| 2,401,797 A | * | 6/1946 | Rasmussen | |
| 2,627,283 A | * | 2/1953 | Przyborowski | |
| 2,752,128 A | * | 6/1956 | Dedo | |
| 2,804,860 A | * | 9/1957 | Tacchella et al. | |
| 2,990,163 A | * | 6/1961 | Farrell | |
| 3,070,975 A | * | 1/1963 | Cornelius | |
| 3,584,682 A | * | 6/1971 | Leedham | 165/51 |
| 4,167,969 A | * | 9/1979 | Ritzenthaler | 165/51 |
| 4,862,951 A | * | 9/1989 | Müller et al. | 165/41 |
| 4,893,670 A | * | 1/1990 | Joshi et al. | 165/51 |
| 4,944,343 A | * | 7/1990 | Müller | 165/51 |

OTHER PUBLICATIONS

*Powertrain Cooling Heavy–Duty Oil Coolers*, Delphi Automotive Systems, Harrison Thermal Systems, 200 Upper Mountain Road, Lockport, NY 14094.
*Powertrain Cooling Radiators*, Delphi Automotive Systems, Harrison Thermal Systems, 200 Upper Mountain Road, Lockport, NY 14094.
*Powertrain Cooling Modules*, Delphi Automotive Systems, Harrison Thermal Systems, 200 Upper Mountain Road, Lockport, NY 14094.
*Powertrain Cooling Automotive Oil Coolers*, Delphi Automotive Systems, Harrison Thermal Systems, 200 Upper Mountain Road, Lockport, NY 14094.

* cited by examiner

Primary Examiner—John K. Ford
(74) Attorney, Agent, or Firm—Simmons, Perrine, Albright & Ellwood, P.L.C.

(57) ABSTRACT

A system and method for providing a transmission fluid heat exchanger which is external to an engine radiator, an in-line with respect to radiator hose coupled to the engine radiator.

5 Claims, 2 Drawing Sheets

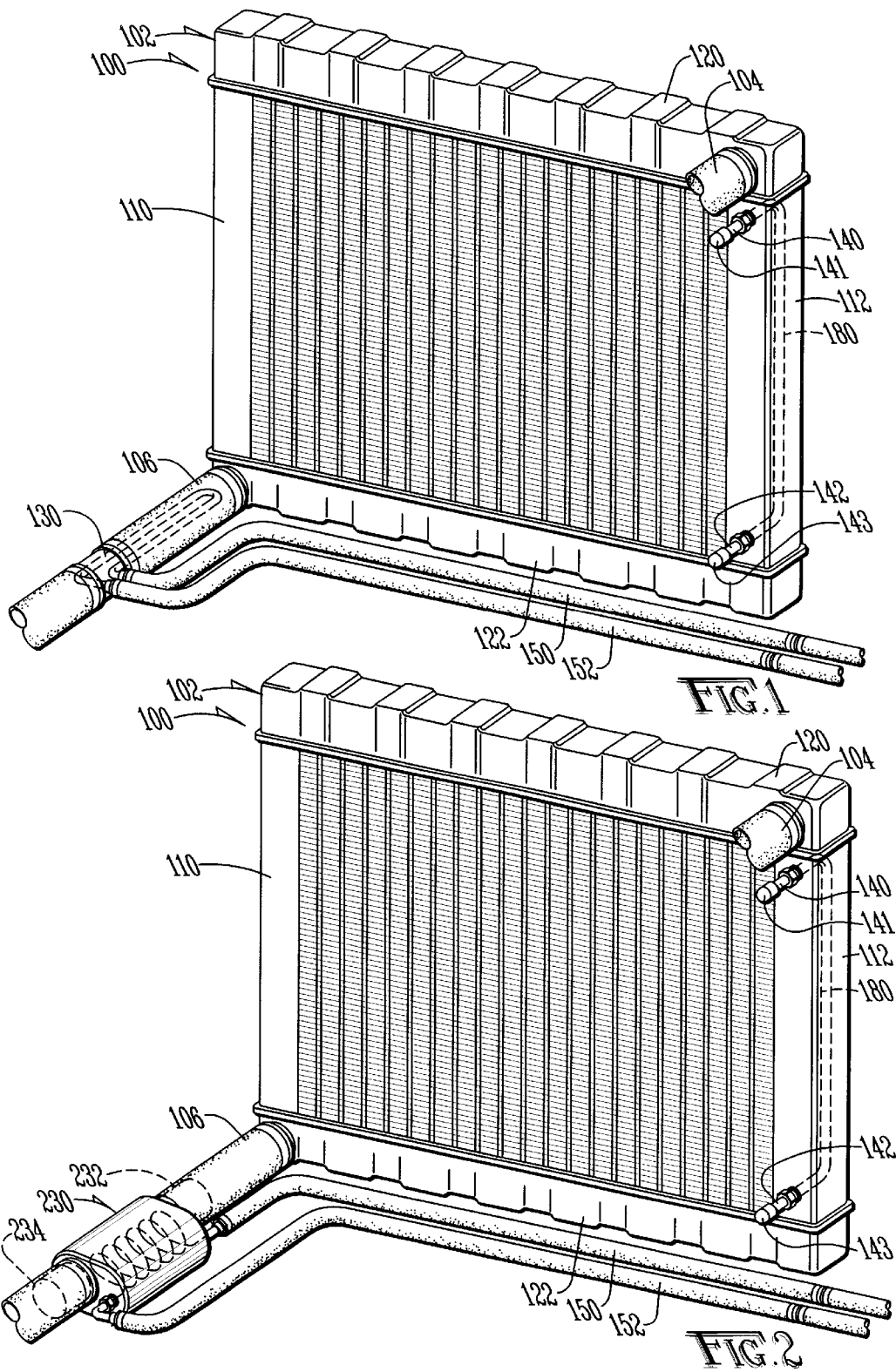

METHOD AND SYSTEM FOR PROVIDING A TRANSMISSION FLUID HEAT EXCHANGER IN-LINE WITH RESPECT TO AN ENGINE COOLING SYSTEM

CROSS REFERENCE TO RELATED APPLICATIONS

This application relates to co-pending application Ser. No. 10/063,919 entitled "METHOD AND SYSTEM FOR PROVIDING A MODULAR TRANSMISSION HEAT EXCHANGER INTERNAL TO A RADIATOR" by the same inventor and filed on even date herewith.

BACKGROUND OF INVENTION

In the past, automotive engineers have endeavored to consolidate transmission coolers with engine radiators. Typically, when this is done, a heat exchanger is disposed within an engine radiator, and it is coupled to supply lines which carry transmission fluid from the transmission. The water or engine coolant in the engine radiator that is used to circulate through and cool the engine is cooled in the radiator. When a transmission cooler heat exchanger is integrated into the engine radiator, it is usually inside one end of the radiator. Input and out-put hoses or piping is usually coupled at the bottom and top of the radiator. The transmission fluid then can be cooled by circulation through the heat exchanger. Also, when internal to the radiator transmission heat exchangers are used in cold environments, especially when starting a cold vehicle, the transmission fluid can be heated as well.

While this integrated transmission heat exchanger and engine radiator has been widely used in the past, and has been successfully implemented in numerous original equipment manufacturers' engine radiators, it does have drawbacks.

The heat exchanger for the transmission can become clogged with sediment or other debris within the engine radiator. Much effort has been made to improve the procedures for flushing of the engine radiator which can help to reduce this sediment and associated clogging of the heat exchanger; but it is often difficult, if not impossible, to completely remove all sediment from heat exchangers disposed within the engine radiator.

Consequently, there exists a need for improved methods and systems for cooling and heating transmission fluid in an efficient manner.

SUMMARY OF INVENTION

It is an object of the present invention to provide a system and method for utilizing an in-line transmission heat exchanger in an efficient manner.

It is a feature of the present invention to utilize a transmission fluid heat exchanger which is disposed within or coupled to a radiator hose extending from the radiator to the engine.

It is an advantage of the present invention to achieve improved efficiency in repairing, replacing and maintaining proper function of a transmission fluid heat exchanger which is internal to the engine cooling system.

The present invention is an apparatus and method for providing transmission fluid heat exchanging capabilities in an engine cooling system, designed to satisfy the aforementioned needs, provide the previously stated objects, include the above-listed features, and achieve the already articulated advantages. The present invention is carried out in a "wasted radiator-less" manner in a sense that there is no longer a need to replace and discard an entire engine radiator when only a transmission cooler/heat exchanger is in need of replacement.

Accordingly, the present invention is a system and method including a transmission fluid heat exchanger disposed in-line with respect to a radiator hose carrying engine coolant between the radiator and the engine.

BRIEF DESCRIPTION OF DRAWINGS

The invention may be more fully understood by reading the following description of the preferred embodiments of the invention, in conjunction with the appended drawings wherein:

FIG. 1 is a perspective view of a system of the present invention.

FIG. 2 is a perspective view of an alternate heat exchanger system of the present invention.

DETAILED DESCRIPTION

Figure 3:
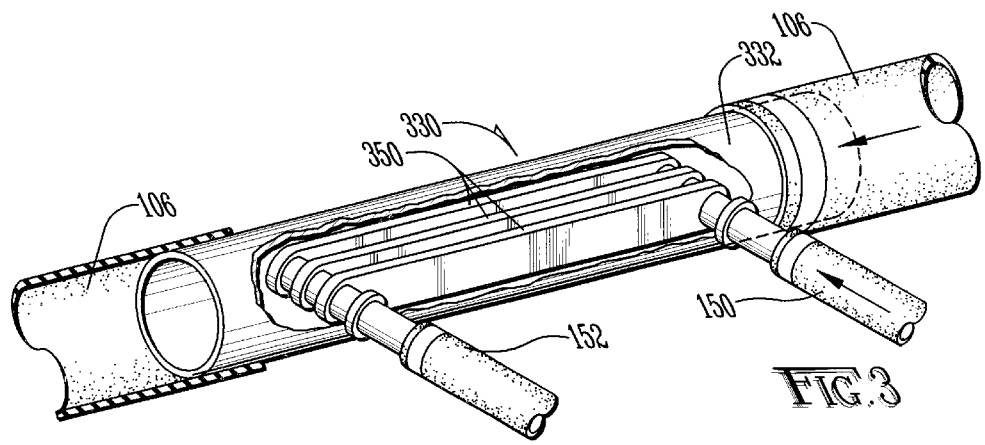
FIG. 3 is a partial cross-sectional and a partial cut-away view of an alternate embodiment of the present invention with an in-line external oil cooler having an in-line internal engine coolant flow path therethrough and as shown in the cut-away section, having a plurality of heat exchange plates therein.

Now referring to the drawings wherein like numerals refer to like matter throughout, and more specifically referring to FIG. 1, there is shown a system of the present invention generally designated 100, including an engine radiator 102 having an engine radiator upper hose 104 and an engine radiator lower hose 106 coupled thereto. Engine radiator 102 is-shown having an engine radiator left side 110, an engine radiator right side 112, an engine radiator top side 120 and an engine radiator bottom side 122.

Engine radiator 102 is shown having an internal to the radiator integrated heat exchanger 180 at the engine radiator right side 112. Internal to the radiator integrated heat exchanger 180 represents a heat exchanger which is part of an original or earlier installed transmission heat exchanging system. Internal to the radiator integrated heat exchanger 180 is shown as being disconnected or bypassed by disconnecting transmission fluid inflow line 140 and transmission fluid outflow line 142 and capping them with transmission fluid inflow line cap 141 and transmission fluid outflow line cap 143, respectively. These supply lines are run to transmission fluid heat exchanger in-line module 130, which is shown disposed in engine radiator lower hose 106. Transmission fluid heat exchanger in-line module 130 performs the same functions as does internal to the radiator integrated heat exchanger 180; however, it is removable from the engine radiator lower hose 106 and is, therefore, readily replaceable.

Transmission fluid heat exchanger in-line module 130 is shown having a transmission fluid inflow line 140 and a transmission fluid outflow line 142. These lines are configured to couple to supply and return lines of transmission fluid in a manner well known in the art. While transmission fluid heat exchanger in-line module 130 is shown in engine radiator lower hose 106, it could be disposed in engine radiator upper hose 104 as well.

An alternate embodiment of the present invention can be understood by now referring to FIG. 2, which shows an alternate to the transmission fluid heat exchanger in-line module 130. Transmission fluid heat exchanger 230 is similar in function to transmission fluid heat exchanger in-line module 130 and in design as well, except that transmission fluid heat exchanger 230 is not disposed with engine radiator lower hose 106 or (engine radiator upper hose 104) like transmission fluid heat exchanger in-line module 130, but in an offset or external to the hose location. Transmission fluid heat exchanger 230 is coupled to engine radiator lower hose 106 by transmission fluid heat exchanger input hose 232 and by transmission fluid heat exchanger output hose 234. Otherwise, it is functionally identical to transmission fluid heat exchanger in-line module 130. Transmission fluid heat-exchanger 230 is shown disposed in engine radiator lower hose 106, but it, too, could be disposed in engine radiator upper hose 104 as well. Transmission fluid heat exchanger 230 is shown coupled with transmission fluid heat exchanger input hose 232 and transmission fluid heat exchanger output hose 234. The above-described design is more representative of an aftermarket design. In certain aftermarket designs and in original equipment manufacturer designs, the transmission fluid heat exchanger 230 could be coupled directly to portions of engine radiator lower hose 106 (or engine radiator upper hose 104).

In operation, the apparatus and method of the present invention as described in FIGS. 1–2, could function as follows:

An engine radiator 102 is provided with an internal to the radiator integrated heat exchanger 180 therein. When internal to the radiator integrated heat exchanger 180 becomes in need of servicing, transmission fluid inflow line 140 and transmission fluid outflow line 142 are detached from supply and return lines coupled thereto. These supply and return lines are then coupled to transmission fluid heat exchanger in-line module 130 or transmission fluid heat exchanger 230, which are coupled within engine radiator upper hose 104 or engine radiator lower hose 106. Transmission fluid inflow line 140 and transmission fluid outflow line 142 are capped with transmission fluid inflow line cap 141 and transmission fluid outflow line cap 143 respectively. The transmission fluid is thereby by-passed from the internal to the radiator integrated heat exchanger 180 to the new heat exchanger.

Now referring to FIG. 3, there is shown an alternate embodiment of the present invention including an external heat exchanger 330, with an internal flow-through engine coolant channel 332 therethrough. Oil supply lines 150 and 152 carry oil to and from the source of heated oil. Heat exchanger 330 has a cut-away portion exposing a plurality of heat exchanger plates 350 therein. It should be understood that plates, fins, coils and any other suitable structure for exchanging heat may be substituted for heat exchanger plates 350.

Figure 4:
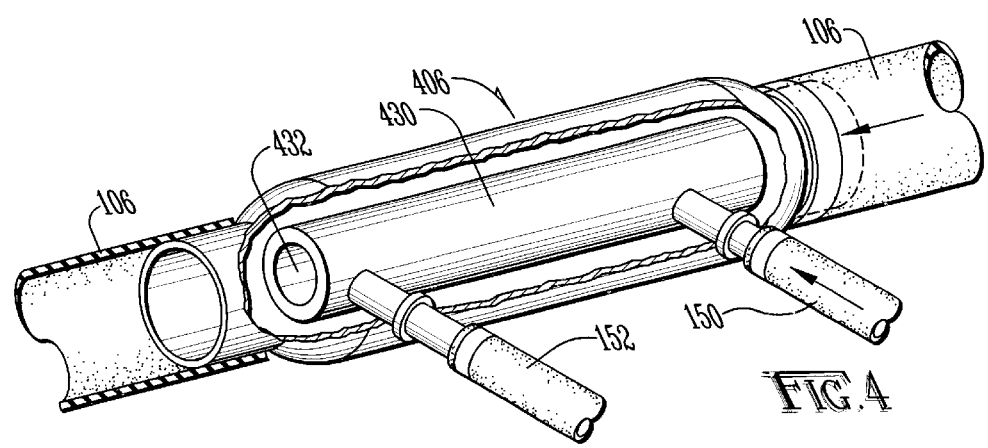
FIG. 4 is a partial cross-sectional view of an alternate embodiment of the present invention with an in-line internal oil cooler having an in-line internal engine coolant flow path therethrough.

Now referring to FIG. 4, there is shown an alternate embodiment of the present invention including an internal heat exchanger 430 disposed in an enlarged channel 406, where the internal heat exchanger 430 has an internal flow-through engine coolant channel 432 extending therethrough. Engine coolant is, therefore, capable of flowing both on the inside and the outside of internal heat exchanger 430.

Throughout this description, reference is made to transmission fluid heat exchanger in-line module 130, transmission fluid heat exchanger 230, and to transmission fluid because it is believed that the beneficial aspects of the present invention would be most readily apparent when used in connection with transmission systems; however, it should be understood that the present invention is not intended to be limited to transmission systems and should be hereby construed to include other non-transmission systems as well. For example, in certain high performance applications where peculiar needs are present, the system could be used for other fluids such as fluid in a differential, brake fluid or any other fluid that might have a heat exchanger in an engine radiator 102.

Similarly, engine radiator 102 need not be limited to just engine radiators. Engine radiator 102 could be a transmission cooler (such as the separate device often mounted in front of the engine radiator 102), and then the transmission fluid heat exchanger in-line module 130 and transmission fluid heat exchanger 230 might be a module for exchanging heat from another fluid, such as brake fluids and the transmission fluid in the transmission cooler.

The term "engine coolant" is used herein to refer to any liquid circulated through an engine cooling system. The engine coolant may be comprised of just water, anti-freeze, a mixture of the two, or other liquids. The term "engine coolant" is descriptive of its primary function; however, it should not be limited to solutions or mixtures which only cool an engine. In cases where an engine is started in very cold weather, the engine coolant is often warmer than the transmission fluid; and in such cases, it could theoretically be called a transmission warmer. It is the intention herein that the term "engine coolant" refer to any liquid which is circulated through a system on a vehicle having a primary purpose of cooling the engine.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An automotive heat exchanger system comprising:
    an engine radiator for exchanging heat between engine coolant and air;
    said engine radiator having a disconnected internal a radiator integrated heat exchanger therein;
    means, external to said engine radiator, for exchanging heat between transmission fluid and said engine coolant;
    wherein said means, external to said engine radiator, for exchanging heat is an elongated heat exchanger having a maximum width characteristic smaller than a maximum width characteristic of a portion of an engine radiator lower hose coupled to said engine radiator;
    wherein said portion of said engine radiator lower hose is an enlarged portion; and
    wherein said internal to a radiator integrated heat exchanger has supply and return ports thereto which have been capped.

2. A cooling system comprising:
    an engine radiator configured to cool engine coolant circulating through an internal combustion engine;
    an engine radiator upper hose coupled to said engine radiator;
    an engine radiator lower hose coupled to said engine radiator;

a transmission fluid heat exchanger coupled, via an in-line coupling, to an engine radiator hose coupled to said engine radiator;

said transmission fluid heat exchanger coupled to a source of circulating transmission fluid;

wherein said transmission fluid heat exchanger is disposed between segments of said engine radiator hose;

an internal to the radiator integrated heat exchanger disposed within said engine radiator, where said internal to the radiator integrated heat exchanger is not coupled to a source of transmission fluid supplying a circulating fluid to said transmission fluid heat exchanger; and wherein said internal to the radiator integrated heat exchanger has a capped inflow and a capped outflow.

3. A system of claim 2 further comprising a bent transmission fluid heat exchanger input hose coupled to said engine radiator lower hose and to said transmission fluid heat exchanger, said system further comprising a bent transmission fluid heat exchanger output hose coupled to a portion of said engine radiator lower hose and to said transmission fluid heat exchanger.

4. A cooling system comprising:

an engine radiator with an internal to the radiator integrated heat exchanger disposed therein;

said engine radiator configured for cooling engine coolant circulating through an internal combustion engine;

said internal to the radiator integrated heat exchanger having a capped transmission fluid inflow and a capped transmission fluid outflow;

an engine radiator upper hose coupled to said engine radiator wherein said engine radiator upper hose is configured for transporting said engine coolant;

an engine radiator lower hose coupled to said engine radiator, where said engine radiator lower hose is configured for transporting engine coolant;

a transmission fluid heat exchanger disposed between segments of said engine radiator lower hose and coupled to said engine radiator lower hose via a bent transmission fluid heat exchanger input hose and a bent transmission fluid heat exchanger output hose;

said transmission fluid heat exchanger being coupled to a source of transmission fluid which circulates through a transmission coupled to said internal combustion engine;

whereby heat is exchanged between said transmission fluid and said engine coolant by causing both said engine coolant and said transmission fluid to flow in relative proximity through said transmission fluid heat exchanger and no heat is exchanged by said internal to the radiator integrated heat exchanger with transmission fluid which circulates through said transmission coupled to said internal combustion engine.

5. A cooling system comprising:

an engine radiator with an internal to the radiator integrated heat exchanger disposed therein;

said engine radiator configured for cooling engine coolant circulating through an internal combustion engine;

said internal to the radiator integrated heat exchanger having a closed transmission fluid inflow and closed transmission fluid outflow;

an engine radiator upper hose coupled to said engine radiator wherein said engine radiator upper hose is configured for transporting said engine coolant;

an engine radiator lower hose coupled to said engine radiator, where said engine radiator lower hose is configured for transporting engine coolant;

a transmission fluid heat exchanger disposed between portions of one of said engine radiator lower hose and said engine radiator upper hose;

said transmission fluid heat exchanger being coupled to a source of transmission fluid which circulates through a transmission coupled to said internal combustion engine; and whereby heat is exchanged between said transmission fluid and said engine coolant by causing both said engine coolant and said transmission fluid to flow in relative proximity through said transmission fluid heat exchanger and no heat is exchanged by said internal to the radiator integrated heat exchanger with transmission fluid which circulates through said transmission coupled to said internal combustion engine.

* * * * *